United States Patent

Vixie et al.

[11] Patent Number: 5,826,018
[45] Date of Patent: Oct. 20, 1998

[54] METHOD AND APPPARATUS FOR AUTOMATICALLY DETERMINING THE STARTING LOCATION AND STARTING PROTOCOL OF LAN DATA IN A WAN LINK FRAME

[75] Inventors: Robert L. Vixie, Colorado Springs, Colo.; Pankaj K. Shah, Nashua, N.H.

[73] Assignee: Hewlett-Packard Company, Palo Alto, Calif.

[21] Appl. No.: 626,446

[22] Filed: Apr. 2, 1996

[51] Int. Cl.[6] ............... G06F 13/42; H04L 29/06
[52] U.S. Cl. .......... 395/200.6; 395/285; 370/469; 370/901
[58] Field of Search ............ 395/200.14, 200.02, 395/200.2, 200.03, 200.11, 200.17, 285, 831, 200.31, 200.54, 200.6, 200.67; 370/469, 465, 466, 389, 474, 901, 902, 903, 904, 905, 906, 907; 364/240.8, 242.94, 242.96

[56] References Cited

U.S. PATENT DOCUMENTS

| | | | |
|---|---|---|---|
| 5,086,469 | 2/1992 | Gupta et al. | 380/48 |
| 5,175,817 | 12/1992 | Adams et al. | 395/200 |
| 5,347,524 | 9/1994 | I'Anson et al. | 371/29.1 |
| 5,426,637 | 6/1995 | Derby et al. | 370/85.13 |
| 5,430,709 | 7/1995 | Galloway | 370/13 |
| 5,568,471 | 10/1996 | Hershey et al. | 370/17 |
| 5,594,869 | 1/1997 | Hawe et al. | 395/200.2 |
| 5,678,060 | 10/1997 | Yokoyama et al. | 395/831 |

Primary Examiner—Emanuel T. Voeltz
Assistant Examiner—Tony M. Cole
Attorney, Agent, or Firm—Kevin M. Hart

[57] ABSTRACT

A method and apparatus are disclosed for determining the starting location and starting protocol of LAN data in a WAN frame. A list of offsets and a list of LAN protocols are maintained. For each offset in the offset list, the WAN frame is parsed beginning at the offset and each LAN protocol in the LAN protocol list is looked for, one at a time. If no LAN protocol is recognized to begin at this offset, the next offset in the offset list is chosen and all of the LAN protocols are tried once again beginning at the newly-chosen offset. This process is repeated until all of the LAN protocols are tried at all of the offsets, or until a LAN protocol is recognized. If a LAN protocol is recognized, the offset at which the protocol was recognized is reported, together with the identity of the LAN protocol that was recognized at the offset. If a LAN protocol is not recognized, an appropriate error message is reported.

7 Claims, 8 Drawing Sheets

```
/*              MAIN AUTO-IDENTIFICATION AND LOCATION PROCEDURE              */ frame_pointer = location of the first byte in the frame past the end of the WAN protocol header;
protocol_found_flag = 0;

/*Try all the offsets in the offset list if necessary*/
offset_list_pointer = 0;
while ((offset_list_pointer < = m) && (protocol_found_flag == 0))
{
        ++ offset_list_pointer;
        offset = offset_list (offset_list_pointer);
        bytes_remaining_in_frame =
           total_frame_length - WAN_protocol_header_length-offset;

/*For each offset, try all the protocols in the protocol list if necessary*/
        protocol_list_pointer = 0;
        while ((protocol_list_pointer < = n) && (protocol_found_flag == 0))
        {
                ++ protocol_list_pointer;
                protocol_identification_procedure = procedure corresponding to the entry
                   at protocol_list (protocol_list_pointer);
                protocol_identification_procedure (frame_pointer + offset, bytes_remaining_in_frame);
                if (protocol_identification_procedure returned TRUE) protocol_found_flag = 1;
        }
}
/*If a protocol was found, report its identity and location and update the protocol and offset lists*/
if (protocol_found_flag == 1)
{
        move the entry at protocol_list (protocol_list_pointer) to protocol_list (1);
        move the entry at offset_list (offset_list_pointer) to offset_list (1);
        return (protocol_list (1), offset_list (1));
}
/*If a protocol was not found, report the error*/
else return (error message: no LAN protocols recognized in WAN frame);
```

*FIG. 5*

```
/*          GENERIC DESCRIPTION OF PROTOCOL-SPECIFIC IDENTIFICATION PROCEDURES          */

/*The protocol-specific identification procedure expects two arguments from the calling function.*/
Identification_procedure_for_protocol_X (location_in_frame_at_which_to_begin_parsing, bytes_remaining_in_frame)
{
        /*The procedure attempts to determine whether the data beginning at location_in_frame_at_which_to_begin_parsing
        constitutes a header produced in conformity with protocol X.*/ conclusion_reached_flag = 0;
        /*The procedure parses the frame by performing one, two or all three of the following steps.*/

/*STEP ONE:*/
        {
                perform tests on the frame data that will enable this procedure to conclude with a high
                    probability of success that the frame data was NOT produced in conformity with protocol X;
                if (conclusion is the frame data was NOT produced in conformity with protocol X)
                    conclusion_reached_flag = -1;
        } if (conclusion_reached_flag == 0)
        /*STEP TWO:*/
        {
                perform tests on the frame data that will enable this procedure to conclude with a high
                    probability of success that the frame data WAS produced in conformity with protocol X;
                if (conclusion is the frame data WAS produced in conformity with protocol X)
                    conclusion_reached_flag = 1;
        } if (conclusion_reached_flag == 0)
        /*STEP THREE:*/
        /*If parsing reaches this level, then there is some INTERMEDIATE level of probability that the frame data was produced in
        conformity with protocol X. To resolve the indeterminacy, this procedure calls another protocol-specific identification procedure
        to continue parsing the frame.*/
        {
                /*The procedure assumes the data beginning at location_in_frame_at_which_to_begin_parsing
                is in fact a header that was produced in conformity with protocol X.*/
                tentative_offset = size_of_protocol_X_header;

/*The procedure next makes an assumption about which higher-level protocol it expects to see on top of protocol
                X. In cases where the identity of the expected higher-level protocol is not implicit based on the presence of protocol
                X, the procedure makes this assumption by reading the "next protocol" field in the protocol X header.*/
                determine expected_higher-level_protocol based on implicit knowledge or on "next protocol" field in protocol
                X header;

/*The procedure then calls the protocol-specific identification procedure that corresponds to expected_higher-
                level_protocol, using appropriately modified values as arguments.*/
                identification_procedure_for_expected_higher-level_protocol
                    (location_in_frame_at_which_to_begin_parsing + tentative_offset,
                    bytes_remaining_in_frame-size_of_protocol_X_header);

/*The procedure adopts whatever conclusion is reached by the called procedure.*/
                if (called procedure returned TRUE) conclusion_reached_flag = 1;
                else conclusion_reached_flag = -1;
        }

/*The procedure then reports its conclusion.*/
        if (conclusion_reached_flag == -1) return FALSE;
        else return TRUE;
}
```

METHOD AND APPPARATUS FOR AUTOMATICALLY DETERMINING THE STARTING LOCATION AND STARTING PROTOCOL OF LAN DATA IN A WAN LINK FRAME

FIELD OF THE INVENTION

This invention relates generally to data communications. More specifically, the invention relates to methods for decoding information contained in data frames being transmitted over data communication networks. The invention has particular application in WAN link monitors.

BACKGROUND

Network monitoring plays an important role not only in the design and implementation of data communication networks and protocols, but also in the processes of managing and troubleshooting networks after they have been deployed. Network monitoring devices and systems take a variety of forms. For example, the term "integrated monitor" refers to a monitoring process that runs on an otherwise-existing network device such as a router or gateway. The term "external monitor," on the other hand, generally refers to a stand-alone device that is dedicated to the sole purpose of monitoring a network. Network monitors can also be characterized by the types of networks they are designed to monitor: LAN monitors are designed to monitor activities on local area networks, while WAN monitors are designed to monitor data being transmitted over wide area links.

One attribute common to both LAN and WAN monitors, particularly monitors of the external variety, is the ability to decode the information present in a data frame being transmitted over a network link. This, in turn, depends on the ability to know or to recognize which protocols are being used to produce the data being decoded, because different protocols present data in different ways. For LAN monitors, this task is relatively easy because the basic media access level protocol is generally known and may be specified for the LAN monitor using a configuration routine. Only this minimal level of configuration is generally required for the LAN monitor because each of the LAN protocols in a given LAN protocol stack inserts a field of information into its header indicating by which higher-level protocol the next header was produced. Thus, by knowing which protocol to use in decoding the media access level header, a LAN monitor can determine which protocols to use in decoding the succeeding headers in a LAN frame by reading the next protocol field contained in each header.

The situation is more difficult for WAN link monitors. During the evolution of most currently-existing WAN protocols, the need was not foreseen for defining next protocol fields in the WAN header. Instead, each device having access to WAN link data was, by design, intended to know which protocol stack was being used. Thus, all WAN devices were to be configured ahead of time with knowledge of which protocols to use in decoding the data present on the WAN link. Next-protocol information was not to be transmitted as part of the data frame.

Later, as the need became evident to transmit many different types of LAN protocols over WAN links, a technique known as encapsulation came to be used to solve the "next protocol" problem. All network devices could no longer be expected to have innate knowledge of the particular protocol stack used to produce each of the frames being transmitted over a particular WAN link. Therefore, encapsulation software running on a WAN device such as a bridge or router would insert next protocol information between the WAN header and the first header in the frame that represents LAN data.

Figure 1:
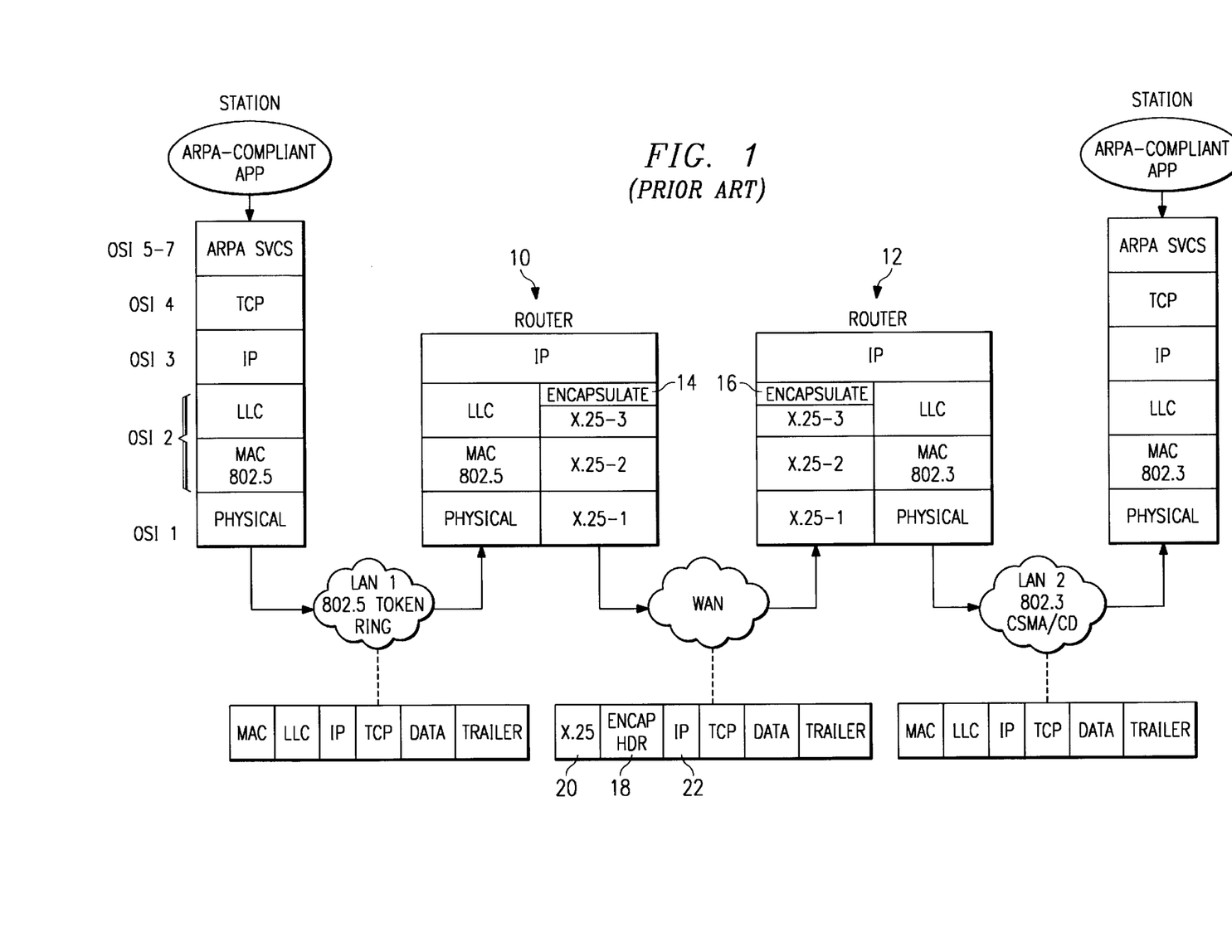
FIG. 1 is a block diagram illustrating a conventional technique for routing LAN data over a WAN link.

By way of example, FIG. 1 illustrates the use of encapsulation to route LAN data over a WAN link. Routers 10 and 12 are equipped with encapsulation software 14 and 16, respectively, in addition to the LAN and WAN protocols necessary to provide an interface between the respective LANs and the WAN. In the illustration, router 10 is equipped with software necessary to implement 802.5 token ring LAN protocols (in addition to the software necessary to interface with the WAN using the X.25 protocol). Router 12 is equipped with software necessary to implement 802.3 CSMA/CD LAN protocols (in addition to the software necessary to interface with the WAN using the X.25 protocol). When an application in LAN 1 needs to send data to an application in LAN 2, encapsulation software 14 running on router 10 manipulates the WAN frame by inserting an encapsulation header 18 between the WAN header 20 and the first header comprising the LAN data—in this case, the IP header 22. (It is a normal function of routers to remove data link layer headers such as MAC and LLC from the LAN frame before transmitting the frame over a WAN link.) The purpose of encapsulation header 18 is to include next protocol information in the frame being transmitted over the WAN link. On the receiving end, encapsulation software 16 in router 12 interprets the next protocol information present in encapsulation header 18, so that router 12 will know which protocol follows encapsulation header 18. Using this information, router 12 then is able to construct new data link layer headers appropriate to LAN 2, and to convey the LAN data to the appropriate application in LAN 2.

Figure 2:
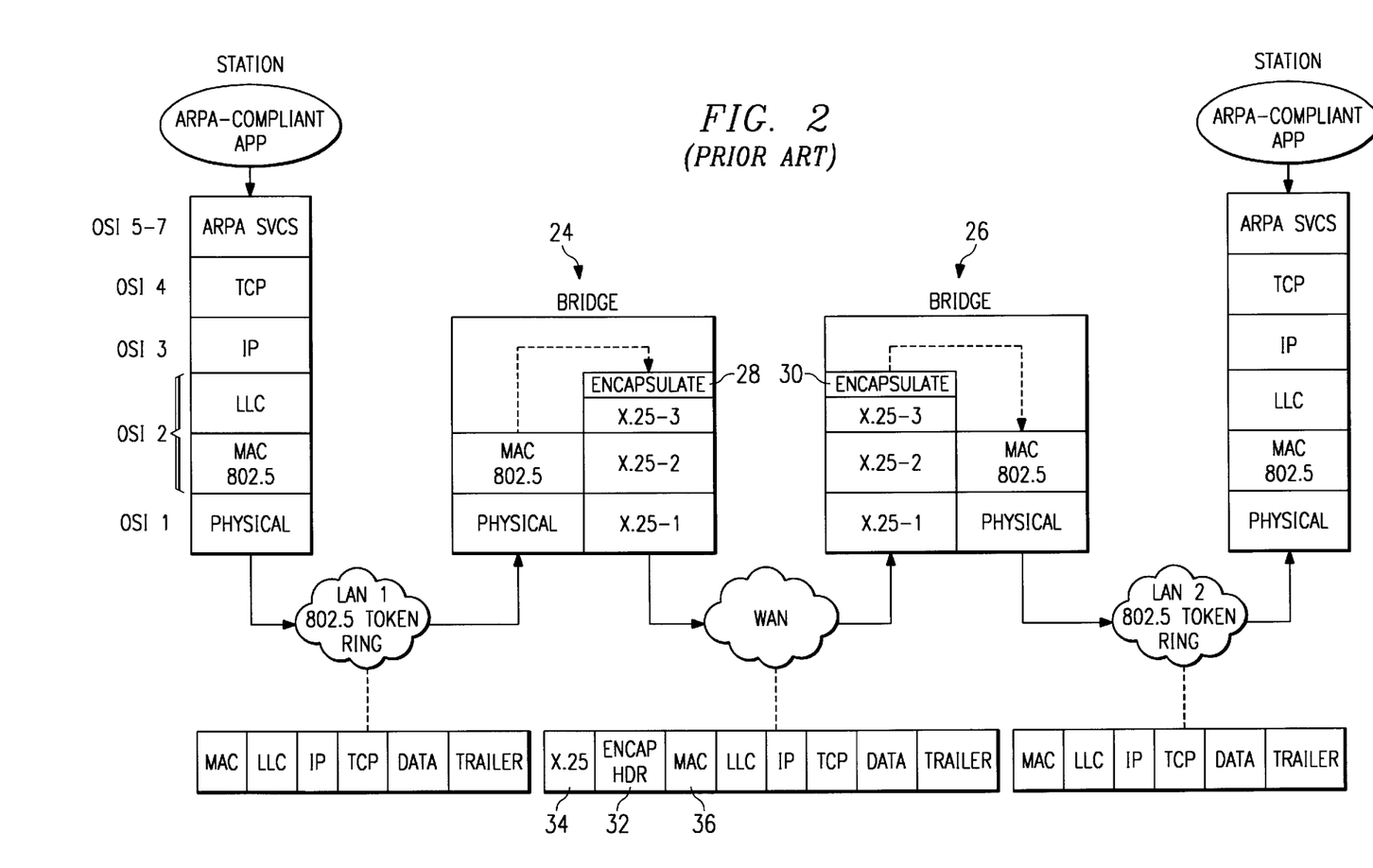
FIG. 2 is a block diagram illustrating a conventional technique for bridging LAN data over a WAN link.

By way of further example, FIG. 2 illustrates the use of encapsulation to bridge LAN data over a WAN link. Bridges 24 and 26 are equipped with encapsulation software 28 and 30, respectively. When an application in LAN 1 needs to send data to an application in LAN 2, encapsulation software 28 inserts an encapsulation header 32 into the WAN frame between WAN header 34 and the first header that comprises LAN data—in this case, MAC header 36. (Unlike routers, bridges do not strip data link layer headers from data frames before forwarding them to other LANs.) Encapsulation software 30 in receiving bridge 26 uses the information present in encapsulation header 32 to know which protocol to use in interpreting the next header, which in this case is MAC header 36.

The use of encapsulation poses special problems for WAN link monitors for several reasons: First, numerous different encapsulation techniques are in common use. Therefore, in order to interpret the next protocol information present in an encapsulation header correctly (as well as all of the information in the frame that follows the encapsulation header), the WAN link monitor must first know which encapsulation technique was used to produce the encapsulation header. Second, encapsulation information is not always present in every frame transmitted over a WAN link. Thus, even if the WAN link monitor knew which type of encapsulation header to look for, it would not necessarily know which frames will contain encapsulation headers and which frames will not.

One prior technique that has been used in WAN link monitors to address this problem has been the technique known as "pattern matching." In pattern matching, the WAN link frame is parsed starting at its beginning, and certain bit patterns are sought to be found as the WAN link frame is traversed from beginning to end. As soon as any one of a predetermined group of bit patterns is found, the protocol corresponding to the found pattern is assumed to be present, and all further information in the frame is decoded based on that assumption. For example, the bit pattern 0800 is commonly used by pattern matching algorithms to identify the start of an IP network layer header in Ethernet. At the same time, however, this bit pattern also represents a certain manufacturer's prefix code in the context of physical and data link layer information. Thus, a pattern matching algorithm could easily encounter the bit pattern of 0800 and assume that it represents the beginning of a certain network protocol header when in fact that was not the case. This problem with pattern matching algorithms results in frequent wrongly-decoded frames.

Therefore, a need exists for a method and apparatus for decoding the LAN payload contained in a WAN link frame quickly and accurately, without having prior knowledge of which LAN protocols may be found in the WAN link frame, and without having prior knowledge of which encapsulation technique, if any, was used to create the WAN link frame.

SUMMARY OF THE INVENTION

The invention is a method and apparatus for determining the starting location and starting protocol of LAN data in a WAN link frame. (Once this information is provided, the remainder of the LAN data may be decoded using the next protocol information present in the LAN protocol headers.) A list of offsets and a list of LAN protocols are provided. For each offset in the offset list, the WAN frame is parsed beginning at the offset and each LAN protocol in the LAN protocol list is looked for, one at a time. If no LAN protocol is recognized to begin at this offset, the next offset in the offset list is chosen and all of the LAN protocols are tried once again beginning at the newly-chosen offset. This process is repeated until all of the LAN protocols are tried at all of the offsets, or until a LAN protocol is recognized. If a LAN protocol is recognized, the offset at which the protocol was recognized is reported, together with the identity of the LAN protocol that was recognized at the offset. If a LAN protocol is not recognized, an appropriate error message is reported.

In an embodiment of the invention, when each LAN protocol is looked for, three levels of scrutiny are applied to the data in the WAN link frame. First, an attempt is made to determine that the data beginning at the chosen offset is not a header produced in accordance with the LAN protocol being looked for. If this attempt is unsuccessful, then an attempt is made to determine that the data beginning at the chosen offset is a header produced in accordance with the LAN protocol being looked for. If this attempt is unsuccessful, then there is some intermediate level of probability that the data beginning at the offset is a header produced in accordance with the LAN protocol being looked for. To resolve the indeterminacy, an assumption is made that the data beginning at the offset is in fact a header produced in accordance with the LAN protocol being looked for. Next, an assumption is made as to which higher-level protocol is expected to follow. Then, the same method is repeated at an appropriate new offset, this time to determine whether the data that follows is in fact a header produced in accordance with the expected higher-level protocol. The method may be repeated several more times recursively in order to resolve all indeterminacies. The result is a highly accurate determination of the starting location and starting protocol of LAN data in the WAN link frame.

In an embodiment of the invention, once a LAN protocol is recognized in a WAN link frame, the offset at which the LAN protocol was found, as well as the identity of the LAN protocol found, are moved to the beginning of the offset list and protocol list, respectively. Subsequent WAN link frames will thus be parsed using the most recently successful offsets and protocols first. Because frames produced by identical protocol stacks are frequently seen back-to-back on a WAN link, this aspect of the invention results in faster protocol recognition for subsequent frames.

BRRIEF DESCRIPTION OF THE DRAWINGS

FIG. 6 is a pseudo-code listing generically illustrating a preferred method for implementing the protocol-specific identification procedures of FIG. 3.

DETAILED DESCRIPTION OF THE PREFERRED EMBODIMENTS

The preferred embodiments of the invention will now be described in detail with reference to FIGS. 3–9, like numbers being used therein to designate like and corresponding parts.

Figure 3:
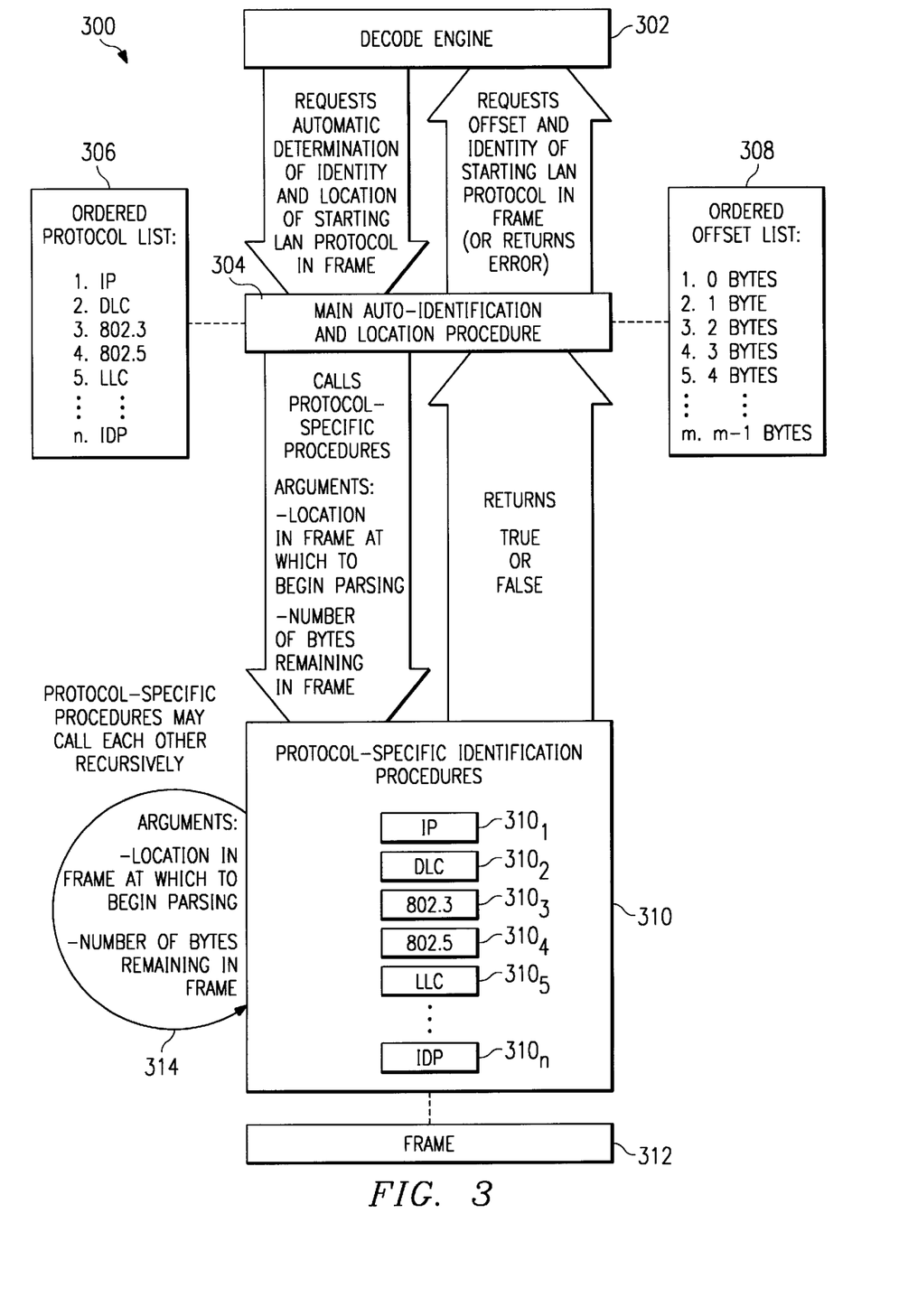
FIG. 3 is a block diagram illustrating a system, according to a preferred embodiment of the invention, for determining the starting location and starting protocol of LAN data in a WAN link frame.

FIG. 3 is a block diagram illustrating a system 300, according to a preferred embodiment of the invention, for determining the starting location and starting protocol of LAN data in a WAN link frame. A decode engine 302 interfaces with a main auto-identification and location procedure 304. Main auto-identification and location procedure 304 maintains an ordered protocol list 306 and an ordered offset list 308. (In a preferred embodiment, offset list 308 is ten entries long and is initialized such that the values contained in the list are as shown in FIG. 3.) Main auto-identification and location procedure 304 interfaces with a plurality of protocol-specific identification procedures $310_{1-n}$. Each of the protocol-specific identification procedures $310_{1-n}$ is capable of operating on the data contained in WAN link frame 312. Moreover, each of the protocol-specific procedures 310 corresponds with one of the entries in ordered protocol list 306. The entries in protocol list 306 (and the corresponding protocol-specific identification procedures) may refer to data link level protocols, network level protocols or to protocols at any other levels, because LAN data encountered in the WAN frame may have been produced by LAN protocols operating at virtually any level in a given data communications model. The particular LAN protocols shown as entries in protocol list 306 in the drawing are for illustration only and should not be understood to constitute an exhaustive list of protocols with which the invention may be used.

In a preferred embodiment, decode engine 302 may be constructed in a conventional manner to decode LAN data present in WAN frame 312 (given the starting location and starting protocol of the LAN data in WAN frame 312) and to display the information so decoded, or to store the information for later analysis. Decode engine 302 requests, from main auto-identification and location procedure 304, the starting location and starting protocol of the LAN data in WAN frame 312. In response, main auto-identification and location procedure 304 returns the offset within the WAN frame at which the first header of LAN data may be found. This offset is measured from the end of the WAN header. Main auto-identification and location procedure 304 also returns the identity of the LAN protocol used to produce the LAN header that begins at the returned offset. In order to provide the information requested by decode engine 302, main auto-identification and location procedure 304 uses the offsets in offset list 308 and the protocol names in protocol list 306 to call protocol-specific identification procedures 310. (The methodology used in calling protocol-specific identification procedures 310 will be described in more detail below.) In doing so, it passes two arguments to each of the called procedures: the location in the WAN link frame at which to begin parsing, and the number of bytes remaining in the WAN link frame (from the point at which parsing is to begin to the end of the WAN link frame). In turn, as is indicated at 314, each of the protocol-specific identification procedures 310 may call one another, if necessary, using appropriately modified arguments.

Figure 4:
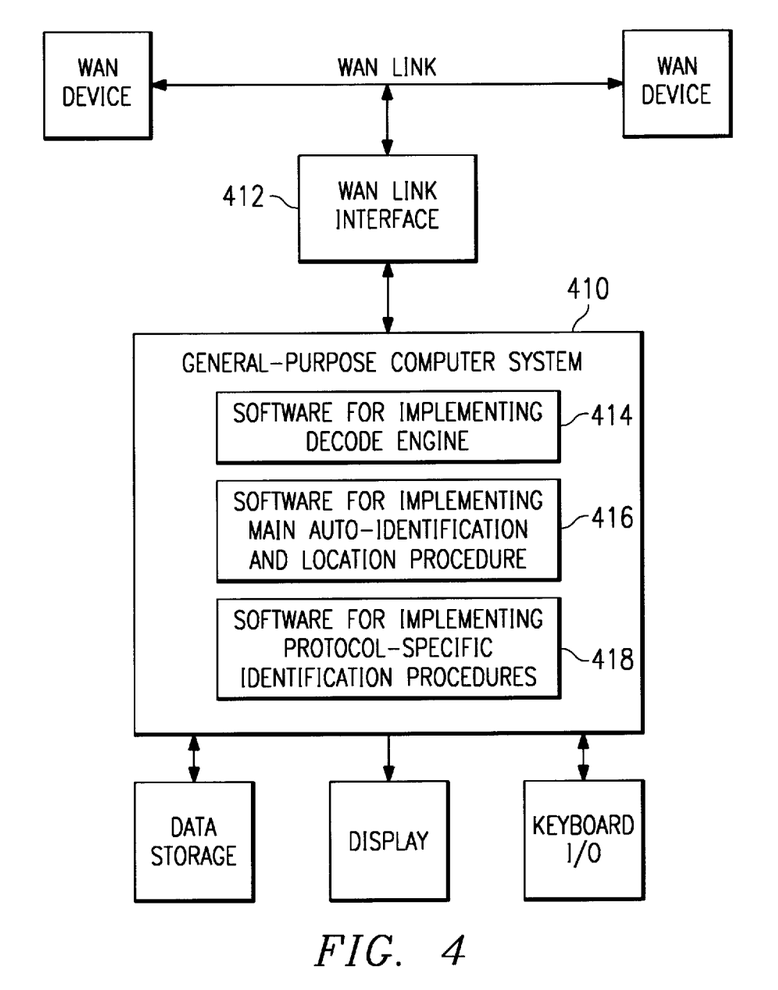
FIG. 4 is a block diagram illustrating how the system of FIG. 3 may be implemented using a general purpose computer.

FIG. 4 is a block diagram illustrating how the system 300 of FIG. 3 may be implemented using a general purpose computer 410. General purpose computer may be any system capable of executing compiled code. For example, general purpose computer 410 may be a UNIX-based system with high processing speed, or a WINDOWS or DOS-based system with perhaps lower processing speed but greater physical portability. In order to capture WAN link frames from the WAN link, general purpose computer system 410 should be interfaced with the WAN link using conventional WAN link interface 412. Running on general purpose computer system 412 should be software 414 for implementing decode engine 302, software 416 for implementing main auto-identification and location procedure 304, and software 418 for implementing protocol-specific identification procedures 310.

Figure 5:
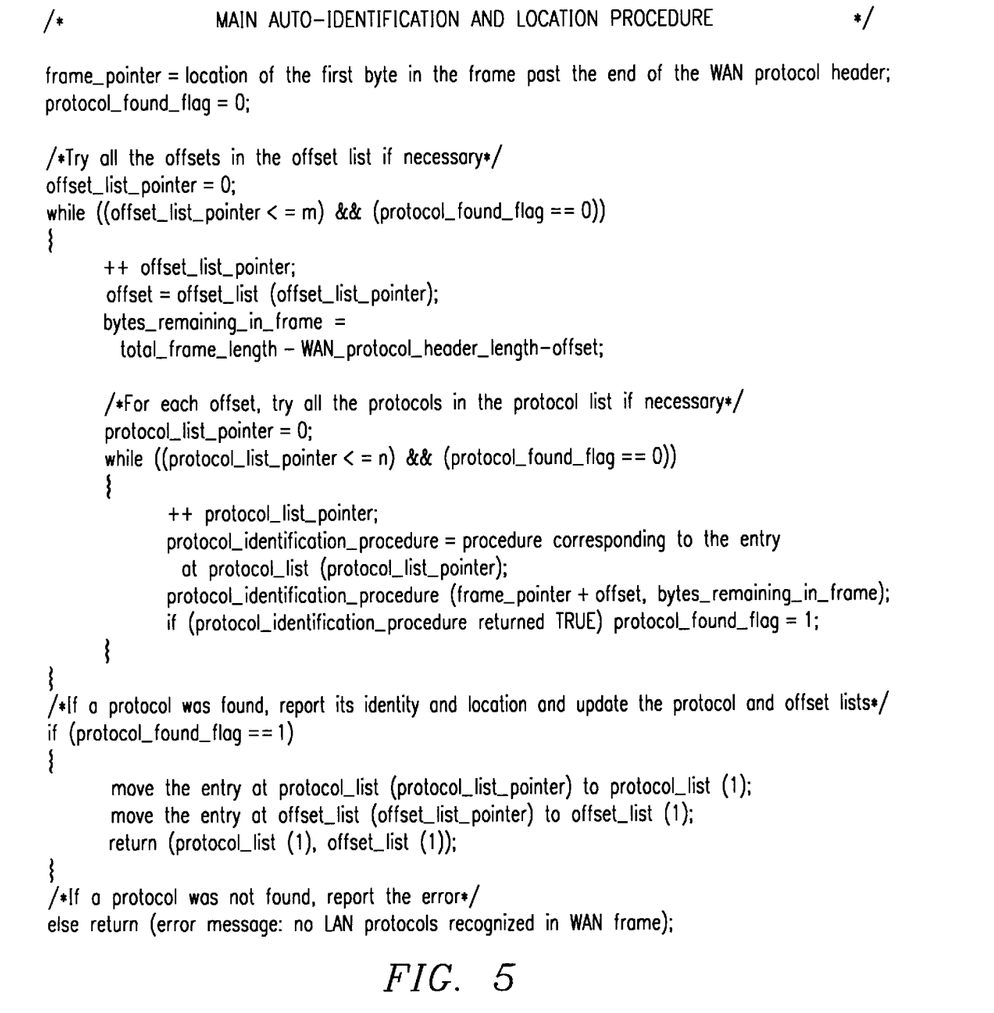
FIG. 5 is a pseudo-code listing illustrating a preferred method for implementing the main auto-identification and location procedure of FIG. 3.

FIG. 5 is a pseudo-code listing illustrating a preferred method for implementing the main auto-identification and location procedure of FIG. 3. Preferably, the code is written in the form of two nested loops. The outer loop preferably steps through the entries in ordered offset list 308 (which is assumed to have been initialized to the values shown in FIG. 3). The inner loop preferably steps through the entries in ordered protocol list 306. The entries in ordered protocol list 306 indicate which protocol-specific identification procedure 310 is to be called by main auto-identification and location procedure 304. The entries in ordered offset list 308 indicate at which position in WAN link frame 312 the called protocol-specific procedure 310 is to begin parsing. This preferred nested loop arrangement has the effect that, for each offset in offset list 308, all of the protocols referred to in protocol list 306 are tried beginning at that offset before moving to the next offset in the list. It will be understood by those having ordinary skill, however, that the nested loop arrangement may be reversed with similar effect such that the outer loop steps through protocol list 306 and the inner loop steps through offset list 308. Note that, once a LAN protocol is recognized in the WAN link frame, the offset at which this LAN protocol was found is moved to the top of offset list 308 so that this offset will be used first when subsequent WAN link frames are sought to be decoded. In this manner, offset list 308 is used as an ordered list so that the most recently found offsets are attempted first when trying to decode WAN data. Likewise, the identity of the recognized LAN protocol is moved to the top of protocol list 306.

FIG. 6 is a pseudo-code listing generically illustrating a preferred method for implementing the protocol-specific identification procedures of FIG. 3. Each protocol-specific identification procedure 310 expects two arguments from the calling function: the location in the WAN frame at which to begin parsing, and the number of bytes remaining in the WAN frame measured from the point at which the procedure is to begin parsing. The overall objective of the procedure is to determine whether the data in the WAN frame beginning at the specified location is in fact a header produced in accordance with a particular LAN protocol. If the protocol-specific identification procedure determines that the data beginning at the specified location is in fact such a header, then the procedure returns TRUE. If it does not, then the procedure returns FALSE. To make this determination, the procedure applies three levels of scrutiny to the data in the WAN frame beginning at the specified location.

First, the procedure attempts to determine that the data in the WAN frame beginning at the specified location is not a header produced in accordance with the pertinent protocol. This may be done by applying such tests to the data as, would a valid header for this protocol fit within the number of bytes remaining in this WAN frame? If not, then the data beginning at the specified location is certainly not a header produced in accordance with the pertinent protocol, and a value of FALSE should be returned.

If it is impossible to conclude with certainty (or high probability) that the data is not a header produced in accordance with the pertinent protocol, then the procedure attempts to determine that the data is such a header. This may be done by applying such tests to the data as, does the next protocol identification field in this "header" identify a higher-level protocol that is very commonly used on top of the protocol being looked for? If so, then there may be a very high level of probability that the protocol being looked for is in fact present, and a value of TRUE should be returned.

If at this point it is still impossible to conclude with certainty (or high probability) that the data is or is not a header produced in accordance with the pertinent protocol, then there is some intermediate level of probability that the protocol being looked for is present. To resolve the indeterminacy, the procedure continues on the assumption that the protocol being looked for is in fact present. Based on this assumption, it calculates a tentative offset equal to the supposed length of the "found" header, and it re-calculates the number of bytes remaining in the WAN frame after the end of the "found" header. It also makes an assumption about which higher-level protocol's header it expects to see after the "found" header. This latter assumption is based on implicit knowledge in cases where only one protocol can validly be placed on top of a given lower-level protocol. In other cases, the assumption is made by reading the next-protocol field in the "found" header. Then, the procedure calls whichever protocol-specific identification procedure 310 that corresponds to the expected next-level protocol, passing as arguments the modified offset and the modified value for the number of bytes remaining in the WAN frame. Importantly, the called procedure may in turn recursively call still other protocol-specific identification procedures if this is required to resolve an indeterminacy. Ultimately, each of the calling procedures adopts the conclusion reached by the called procedure until a final result of TRUE or FALSE is returned to the main auto-identification and location procedure 304.

Figure 7:
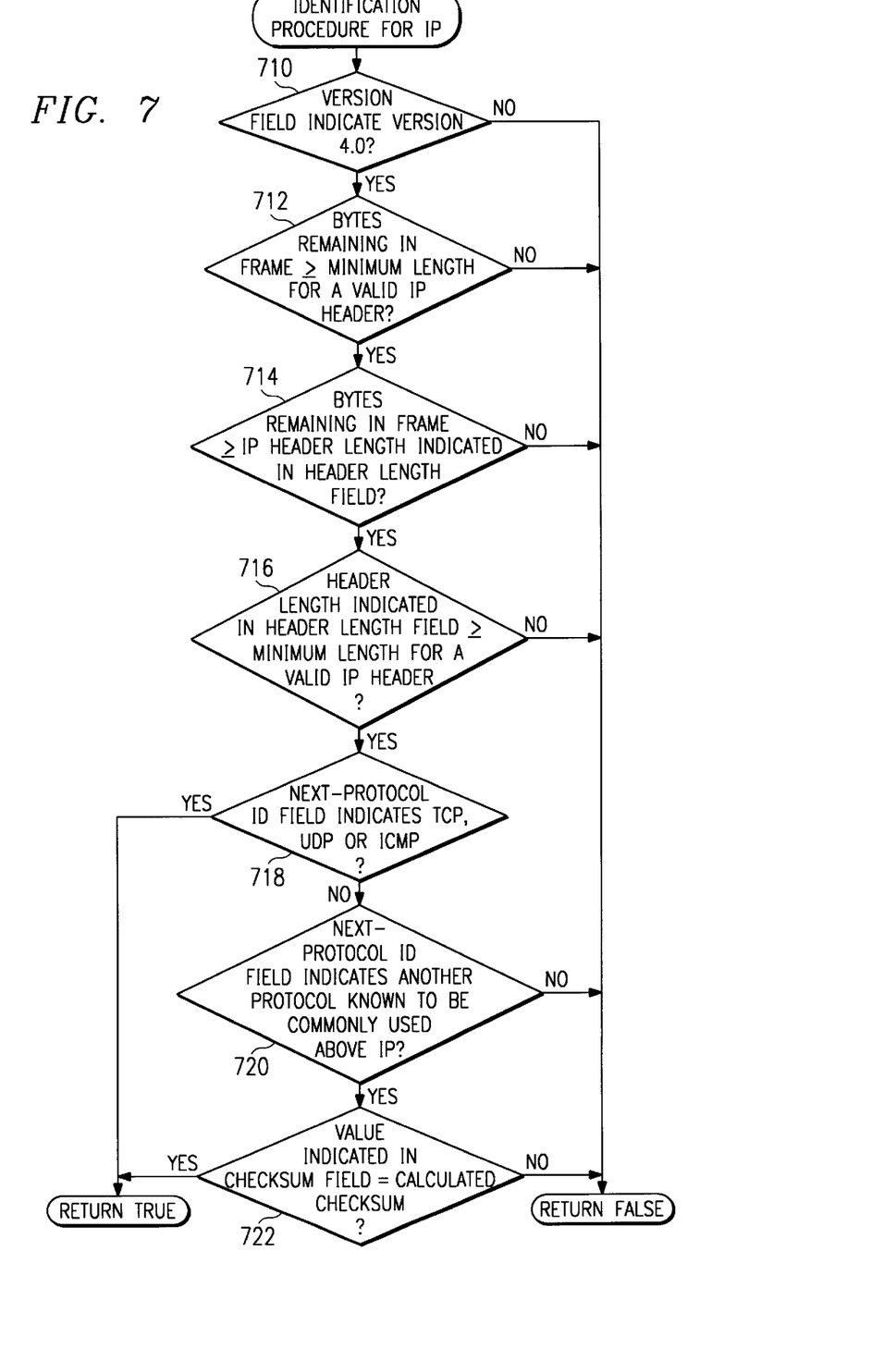
FIG. 7 is a flowchart illustrating a first example of a protocol-specific identification procedure.
Figure 8:
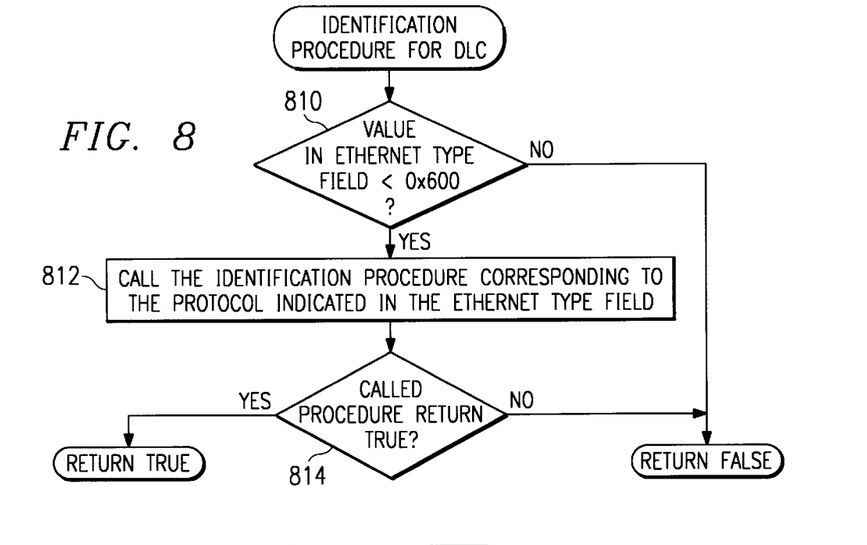
FIG. 8 is a flowchart illustrating a second example of a protocol-specific identification procedure.
Figure 9:
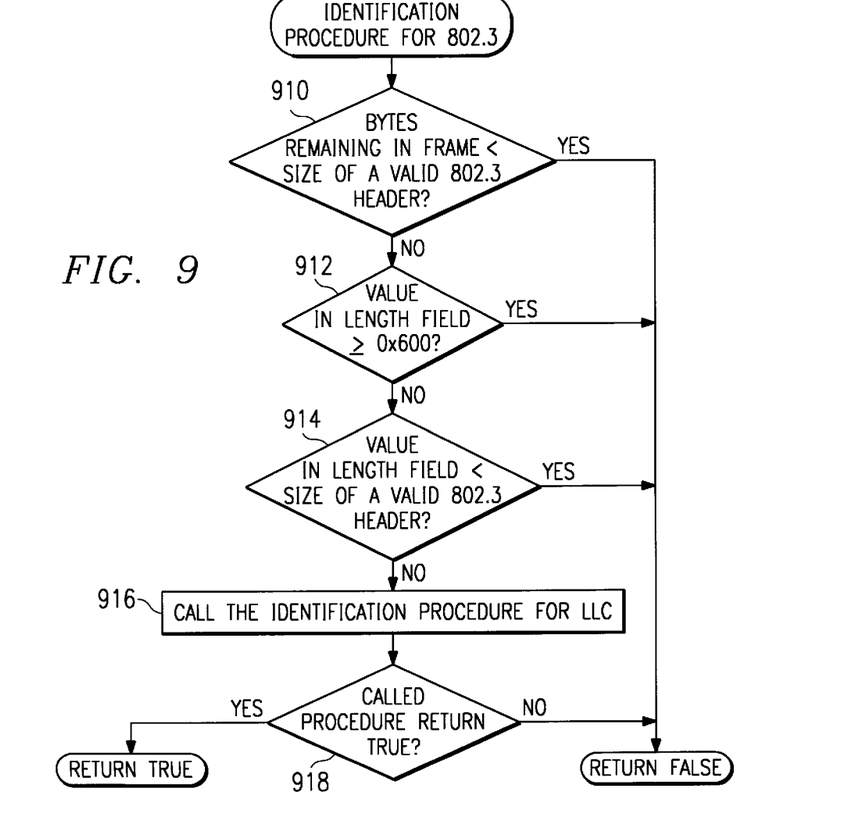
FIG. 9 is a flowchart illustrating a third example of a protocol-specific identification procedure.

It is believed that, given the above description of the preferred embodiments of the invention, persons having ordinary skill in the art will be capable of writing, without undue experimentation, protocol-specific identification procedures 310 corresponding to all LAN protocols of interest. By way of further explanation, however, the flowcharts of FIGS. 7–9 are given as examples. Each of the examples illustrates a procedure written in accordance with the invention for identifying a LAN protocol. The particular examples shown were chosen because they illustrate that all three previously-described levels of scrutiny will not necessarily be applied by each of the protocol-specific identification procedures 310, although each conforms to the generic inventive framework illustrated in FIG. 6.

FIG. 7 is a flowchart illustrating a procedure for identifying a network-layer LAN protocol known popularly as IP ("Internet Protocol"). Tests 710 through 716 attempt to determine with certainty that the data being examined is not an IP header. Tests 718 through 722 attempt to determine with certainty that the data being examined is an IP header. In the procedure illustrated in FIG. 7, no calls to other procedures are contemplated.

FIG. 8 is a flowchart illustrating a procedure for identifying a data link layer LAN protocol known as DLC ("Ethernet Data Link Control"). Test 810 attempts to determine with certainty that the data being examined is not a DLC header. It this test is inconclusive, the procedure determines that the expected next higher-level protocol should be that which is referred to in the next-protocol field of the current header being examined. It then calls, in step 812, the protocol-specific identification procedure corresponding to that protocol. In step 814, it adopts the conclusion reached by the called procedure and returns that result to the calling procedure.

FIG. 9 is a flowchart illustrating a procedure for identifying the well-known LAN CSMA/CD protocol known as IEEE 802.3. In this example, if the procedure is unable to determine with certainty in steps 910 through 914 that the data being examined is or is not an 802.3 header, then a higher-level protocol is looked for. However, rather than determining the expected higher-level protocol by reading a next-protocol field in the present header, the procedure determines the expected higher-level protocol based on implicit knowledge: an LLC protocol header is always expected to be above an 802.3 header.

While the invention has been described above in detail in relation to preferred embodiments thereof, various modifications will be apparent to those having ordinary skill in the art may be made without deviating from the spirit and scope of the invention as defined by the following claims.

What is claimed is:

1. A method for determining the location and starting protocol of LAN data in a WAN-link frame, comprising the steps of:

(a) choosing, from a plurality of different offsets, an offset measured from a predetermined location in the WAN-link frame;

(b) choosing, from a plurality of different protocols, a protocol to try to recognize in the WAN-link frame;

(c) parsing the WAN-link frame to determine whether a header produced in accordance with said protocol begins at said offset;

(d) if it is determined in step (c) that said header produced in accordance with said protocol does not begin at said offset, and if all of the protocols in said plurality of different protocols have not yet been looked for at said offset, choosing another protocol from said plurality of different protocols and repeating step (c);

(e) if it is determined in step (c) that said header produced in accordance with said protocol does begin at said offset, indicating that said offset is the starting location of the LAN data in the WAN-link frame and that said protocol is the starting protocol of the LAN data in the WAN-link frame;

(f) if it is determined in step (c) that said header produced in accordance with said protocol does not begin at said offset, and if all of the protocols in said plurality of different protocols have been looked for at said offset, choosing another offset from said plurality of different offsets and beginning again at step (b); and (g) if all of the protocols in said plurality of different protocols have been looked for at all of the offsets in said plurality of different offsets, and if no protocol headers have yet been recognized, indicating that no LAN data has been identified in the WAN-link frame.

2. The method of claim 1, wherein said step (c) comprises the sub-steps of:

(c)(1) performing a first test on data in the WAN-link frame beginning at said offset, said first test for determining whether said data in the WAN-link frame beginning at said offset does not comprise said header produced in accordance with said protocol;

(c)(2) if said first test is unable to determine that said data in the WAN-link frame beginning at said offset does not comprise said header produced in accordance with said protocol, performing a second test on said data in the WAN-link frame beginning at said offset, said second test for determining whether said data in the WAN-link frame beginning at said offset does comprise said header produced in accordance with said protocol; and (c)(3) if said second test is unable to determine that said data in the WAN-link frame beginning at said offset does comprise said header produced in accordance with said protocol:

making an assumption about the identity of a higher-level protocol;

making an assumption about a higher-level starting location in the WAN-link frame of a higher-level header that may have been produced in accordance with said higher-level protocol; and parsing the WAN-link frame to determine whether said higher-level header begins at said higher-level starting location.

3. The method of claim 1, wherein said plurality of different offsets comprises a first ordered list, wherein said plurality of different protocols comprises a second ordered list, and wherein said step (e) comprises the sub-steps of:

(e)(1) moving said offset to the beginning of said first ordered list; and (e)(2) moving said protocol to the beginning of said second ordered list.

4. A machine-readable program storage device embodying instructions executable by a computer to perform method steps for determining the starting location and starting protocol of LAN data in a WAN-link frame, said method steps comprising:

(a) choosing, from a plurality of different offsets, an offset measured from a predetermined location in the WAN-link frame;

(b) choosing, from a plurality of different protocols, a protocol to try to recognize in the WAN-link frame;

(c) parsing the WAN-link frame to determine whether a header produced in accordance with said protocol begins at said offset;

(d) if it is determined in step (c) that said header produced in accordance with said protocol does not begin at said offset, and if all of the protocols in said plurality of different protocols have not yet been looked for at said offset, choosing another protocol from said plurality of different protocols and repeating step (c);

(e) if it is determined in step (c) that said header produced in accordance with said protocol does begin at said offset, indicating that said offset is the starting location of the LAN data in the WAN-link frame and that said protocol is the starting protocol of the LAN data in the WAN-link frame;

(f) if it is determined in step (c) that said header produced in accordance with said protocol does not begin at said offset, and if all of the protocols in said plurality of different protocols have been looked for at said offset, choosing another offset from said plurality of different offsets and beginning again at step (b); and (g) if all of the protocols in said plurality of different protocols have been looked for at all of the offsets in said plurality of different offsets, and if no protocol headers have yet been recognized, indicating that no LAN data has been identified in the WAN-link frame.

5. The machine-readable program storage device of claim 4, wherein said method step (c) comprises the sub-steps of:

(c)(1) performing a first test on data in the WAN-link frame beginning at said offset, said first test for determining whether said data in the WAN-link frame beginning at said offset does not comprise said header produced in accordance with said protocol;

(c)(2) if said first test is unable to determine that said data in the WAN-link frame beginning at said offset does not comprise said header produced in accordance with said protocol, performing a second test on said data in the WAN-link frame beginning at said offset, said second test for determining whether said data in the WAN-link frame beginning at said offset does comprise said header produced in accordance with said protocol; and (c)(3) if said second test is unable to determine that said data in the WAN-link frame beginning at said offset does comprise said header produced in accordance with said protocol:

making an assumption about the identity of a higher-level protocol;

making an assumption about a higher-level starting location in the WAN-link frame of a higher-level header that may have been produced in accordance with said higher-level protocol; and parsing the WAN-link frame to determine whether said higher-level header begins at said higher-level starting location.

6. The machine-readable program storage device of claim 4, wherein said method step (e) comprises the sub-steps of:

(e)(1) moving said offset to the beginning of said first ordered list; and (e)(2) moving said protocol to the beginning of said second ordered list.

7. Apparatus for determining the starting location and starting protocol of LAN data in a WAN link data frame captured from a WAN link, comprising:

storage means for storing an offset list and a LAN protocol list;

a plurality of protocol-specific identification means, each for determining, responsive to a given offset, whether said WAN link data frame contains a header produced by a certain LAN protocol beginning at said offset, and each of said plural protocol-specific identification means corresponding to at least one of the LAN protocols referenced in said LAN protocol list;

main auto-identification and location means for stepping through said offset list and said LAN protocol list and, for each offset in said offset list, activating the protocol-specific identification means corresponding to each entry in said LAN protocol list until a LAN protocol is recognized in said WAN link data frame, and reporting means for indicating, if a LAN protocol was recognized, which LAN protocol was recognized and the offset in the WAN link data frame at which its header begins and, if a LAN protocol was not recognized, that no LAN protocol was found in the WAN link data frame.

* * * * *